(12) United States Patent
Hsu

(10) Patent No.: US 7,185,213 B2
(45) Date of Patent: *Feb. 27, 2007

(54) METHOD FOR PCI EXPRESS POWER MANAGEMENT USING A PCI PM MECHANISM IN A COMPUTER SYSTEM

(75) Inventor: R-Ming Hsu, Taipei Hsien (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 501 days.

This patent is subject to a terminal disclaimer.

(21) Appl. No.: 10/604,440

(22) Filed: Jul. 21, 2003

(65) Prior Publication Data

US 2005/0022036 A1    Jan. 27, 2005

(51) Int. Cl.
    G06F 1/00 (2006.01)
(52) U.S. Cl. ............... 713/310; 713/300; 710/100
(58) Field of Classification Search ........... 713/300; 710/100
    See application file for complete search history.

(56) References Cited

U.S. PATENT DOCUMENTS

| | | | |
|---|---|---|---|
| 5,974,492 A * | 10/1999 | Gulick | 710/107 |
| 6,282,666 B1 * | 8/2001 | Bays et al. | 713/323 |
| 6,654,896 B1 * | 11/2003 | Saunders et al. | 713/323 |
| 6,675,303 B1 * | 1/2004 | Lam et al. | 713/320 |
| 6,898,766 B2 * | 5/2005 | Mowery et al. | 716/1 |
| 2004/0201956 A1 * | 10/2004 | Conway | 361/686 |
| 2004/0210778 A1 * | 10/2004 | Naveh et al. | 713/300 |
| 2005/0022035 A1 * | 1/2005 | Hsu | 713/300 |

* cited by examiner

*Primary Examiner*—Rehana Perveen
*Assistant Examiner*—James F. Sugent
(74) *Attorney, Agent, or Firm*—Winston Hsu

(57) ABSTRACT

A method for PCI ExpressPower Management using a PCI PM mechanism in a computer system. The computer system includes a PCI PME (Power Management Event) controller and a PCI Express Root Complex. The method includes converting a plurality of PM_PME packets generated by the PCI Express Root Complex into a Pseudo-PME signal, a first PM_PME packet of the plurality of PM_PME packets asserting the Pseudo-PME signal. A Pseudo-PME line electrically connected with a PME input of the PCI PME controller and the PCI Express Root Complex is provided for transmitting the Pseudo-PME signal to the PCI PME controller. The PME input receives PME signals generated by PCI-compliant devices through a PCI Bus of the computer system. The method further includes de-asserting the Pseudo-PME signal. The de-assertion of the Pseudo-PME signal follows the assertion of the Pseudo-PME signal by a predetermined time interval.

12 Claims, 2 Drawing Sheets

METHOD FOR PCI EXPRESS POWER MANAGEMENT USING A PCI PM MECHANISM IN A COMPUTER SYSTEM

BACKGROUND OF INVENTION

1. Field of the Invention

The present invention relates to a method for power management in a computer system, and more particularly, to a method for PCI (Peripheral Component Interconnect) Express PM (Power Management) using a PCI PM mechanism in a computer system.

2. Description of the Prior Art

According to the PCI (Peripheral Component Interconnect) Express specification for power management of a computer system, a device can use a PM_PME packet (a packet of the Transaction Layer) to request the computer system to generate an interrupt to awaken a computer system from a non-working mode (such as a standby mode or a sleeping mode). The PCI Express interrupt is similar to the PME (Power Management Event) interrupt defined by the PCI specification. Through the interrupt defined by the PCI Express specification, the computer system is not only PCI Express-compliant but also PCI-compliant.

It is expensive to include a PCI Express awakening mechanism, which is similar to a well-known PCI PME controller, when needed to implement a computer system complying with both the PCI Express specification and the PCI specification. Moreover, some software and hardware conflicts (such as conflicting ACPI event reports and conflicting power-on sequences) between the PCI Express specification and the PCI specification exist if original microchips are used for reducing the production cost. Therefore, a cost-effective method is needed to handle the power management of the computer system.

SUMMARY OF INVENTION

It is therefore a primary objective of the claimed invention to provide a method for PCI (Peripheral Component Interconnect) Express PM (Power Management) to solve the above-mentioned problem.

According to the claimed invention, provided is a device and method for PCI Express PM to use a PCI PM mechanism in a computer system having a PCI PME (Power Management Event) controller and a PCI Express Root Complex The method includes converting a plurality of PM_PME packets generated by the PCI Express Root Complex into a Pseudo-PME signal. The first PM_PME packet asserts the Pseudo-PME signal so that a voltage of Pseudo-PME signal changes from a high level to a low level. The claimed invention further provides a Pseudo-PME line electrically connected with a PME input of the PCI PME controller and the PCI Express Root Complex for transmitting the Pseudo-PME signal to the PCI PME controller. The PCI PME may have an event register for reporting the PME to the computer system that is set by the Pseudo-PME signal. The PME input receives PME signals generated by PCI-compliant devices through a PCI Bus of the computer system. Additionally, the disclosure includes de-asserting the Pseudo-PME signal so that the voltage of the Pseudo-PME signal changes from the low level to the high level. The de-assertion of the Pseudo-PME signal follows the assertion of the Pseudo-PME signal by a predetermined time interval. A driver program resident in a memory of the computer system may be executed by the computer system to clear the event register when the Pseudo-PME signal changes from the low level to the high level. Both the high level and the low level of the voltage of the Pseudo-PME signal are PCI-compliant.

It is an advantage of the claimed invention that a PCI Express awakening mechanism is not needed to implement a computer system complying with both the PCI Express specification and the PCI specification so that related costs are reduced. Moreover, original microchips can be used to reduce the related costs. Furthermore, the software and hardware conflicts (such as the conflicting ACPI event reports and the conflicting power-on sequences) between the PCI Express specification and the PCI specification are eliminated, as there is no second awakening mechanism according to the present invention.

These and other objectives of the claimed invention will no doubt become obvious to those of ordinary skill in the art after reading the following detailed description of the preferred embodiment that is illustrated in the various figures and drawings.

DETAILED DESCRIPTION

According to the PCI Express specification for power management of a computer system, a device can use a PM_PME packet (a packet of the Transaction Layer) to request a computer system to generate an interrupt to awaken the computer system from a non-working mode (such as a standby mode or a sleeping mode). The PCI Express interrupt is similar to the PME (Power Management Event) interrupt defined by the PCI specification.

In brief, after a device register of a PCI Express-compliant device is set, a plurality of PM_PME packets are generated intermittently to notify the computer system to take action on the PME until the computer system clears the device register. The present invention method transforms the PM_PME packets of the PCI Express specification into a signal similar to a PME signal of the PCI specification so that a PCI PM (Power Management) mechanism is triggered to take action.

Figure 1:
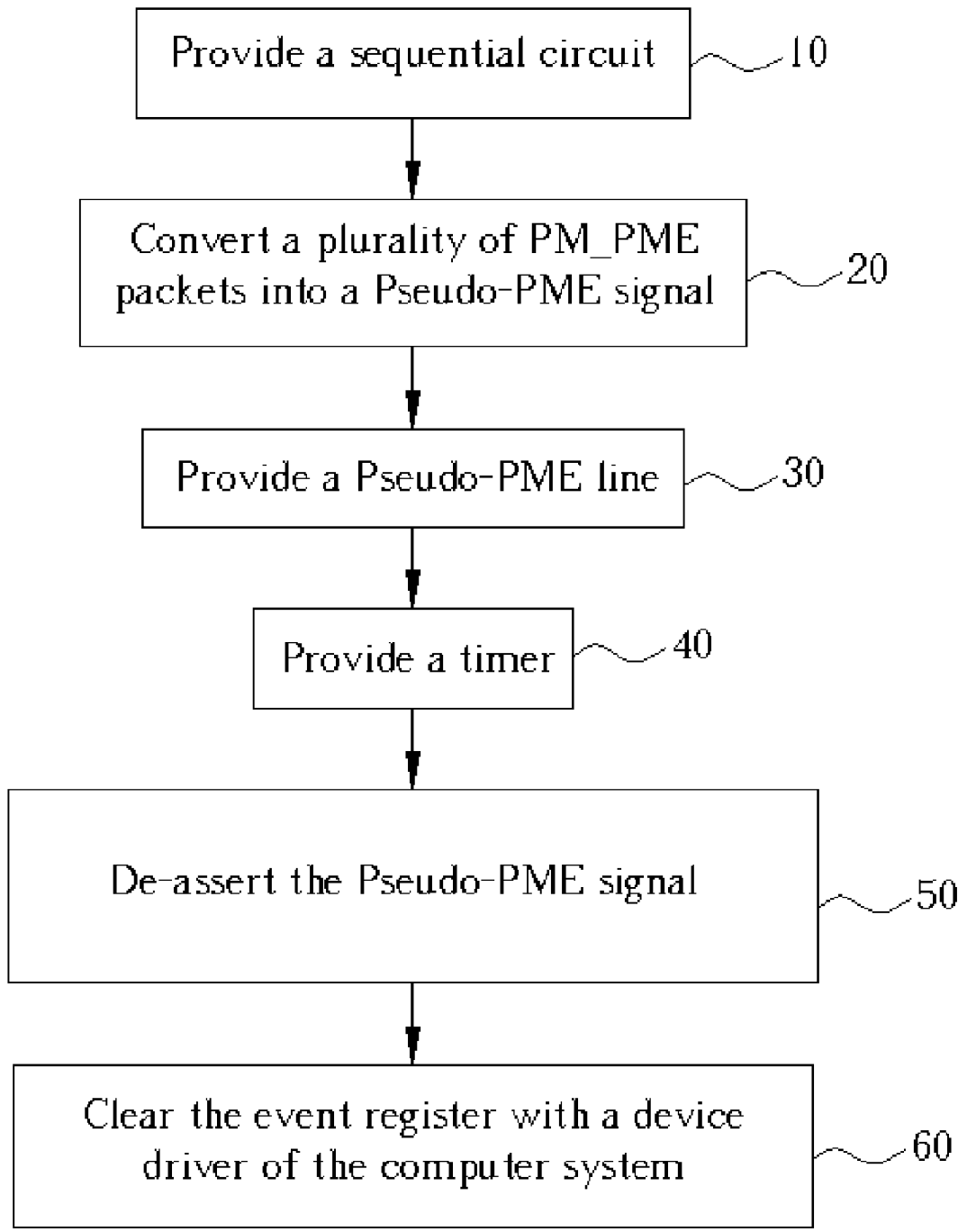
FIG. 1 is a flowchart diagram of a method for PCI Express Power Management using a PCI PM mechanism in a computer system according to the present invention.

Please refer to FIG. 1 showing a flowchart diagram of a method for PCI Express PM to use a PCI PM mechanism in a computer system according to the present invention. The computer system includes a PCI PME controller, which is a chipset of the computer system handling PCI-compliant devices well-known in the prior art, and a PCI Express Root Complex, which is a PCI Express-compliant intermediate element handling PCI Express-compliant devices. The method is described as follows while the order of steps is not limiting.

Step 10: Provide a sequential circuit, such as a latch or a flip-flop, in the PCI Express Root Complex.

Step 20: Convert a plurality of PM_PME packets generated by the PCI Express Root Complex into a Pseudo-PME signal with the sequential circuit, the first PM_PME packet of the plurality of PM_PME packets asserting the Pseudo-PME signal so that a voltage of Pseudo-PME signal changes from a high level to a low level.

Step 30: Provide a Pseudo-PME line electrically connected to a PME input of the PCI PME controller and the PCI Express Root Complex for transmitting the Pseudo-PME signal generated by the sequential circuit of the PCI Express Root Complex to the PCI PME controller. The PME input receives PME signals generated by PCI-compliant devices through a PCI Bus of the computer system.

Step 40: Provide a timer to control a time interval between asserting and de-asserting the Pseudo-PME signal.

Step 50: De-assert the Pseudo-PME signal so that the voltage of the Pseudo-PME signal changes from the low level to the high level. The de-assertion of the Pseudo-PME signal follows the assertion of the Pseudo-PME signal by a predetermined time interval.

Step 60: Clear the event register with a program stored in a memory of the computer system, such as a device driver.

The high level and the low level of the voltage of the Pseudo-PME signal mentioned above are PCI-compliant so that the PCI PME controller treats the Pseudo-PME signal as a normal PME signal. Without a definition in the PCI specification, the PCI PME controller usually includes an event register (for reporting the PME to the computer system) that can be set by the PCI PME controller when the Pseudo-PME signal (or a PME signal) is asserted but cannot be cleared when the Pseudo-PME signal is deasserted. Step 60 will solve the problem of inability to clear the event register of a computer system using the above-mentioned architecture.

Figure 2:
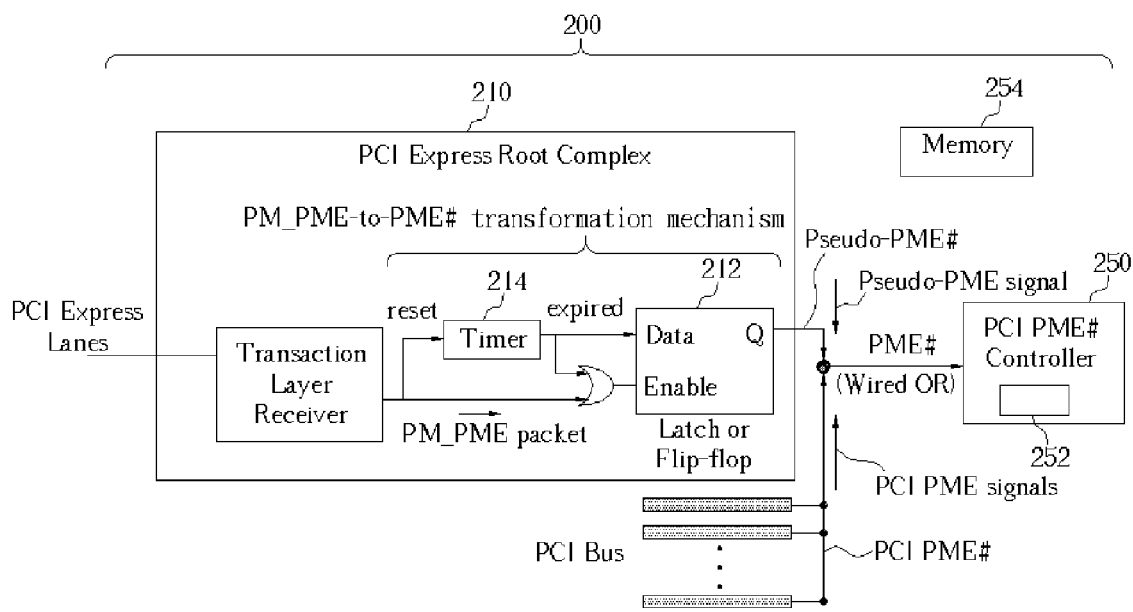
FIG. 2 is a parabolic block diagram of related elements of the computer system of FIG. 1.

Please refer to FIG. 2 showing a parabolic block diagram of related elements of the computer system of FIG. 1. The PME#, the Pseudo-PME#, the PCI PME#, and the PCI PME# Controller shown in FIG. 2 are the above mentioned PME input, the above mentioned Pseudo-PME line, the line for receiving the above mentioned PME signals, and the above mentioned PCI PME controller respectively.

Another embodiment of the present invention is described as follows. The timer mentioned above is not the only way to control the time interval between asserting and deasserting the Pseudo-PME signal. This embodiment further comprises converting a pulse of a PM_PME packet of the plurality of PM_PME packets into a lower frequency pulse to control the time interval between asserting and de-asserting the Pseudo-PME signal. According to this embodiment, a synchronizer is provided to convert the pulse of the PM_PME packet of the plurality of PM_PME packets into the lower frequency pulse. When the lower frequency pulse is an active-low pulse, it may be used as the Pseudo-PME signal in the computer system.

The above-mentioned embodiment is useful under the condition of the plurality of PM_PME packets being designed to work at a relatively high frequency so that the sequential circuit cannot be triggered by the pulse. In this situation, the above mentioned variation can make the pulse-width of the pulse long enough to trigger the sequential circuit.

Please refer to FIG. 2 again. While the above mentioned method is provided, the present invention correspondingly provides a computer system 200 comprising a PCI Express Root Complex 210 for generating a plurality of PM_PME packets and a sequential circuit 212 electrically connected to the PCI Express Root Complex 210 for converting the plurality of PM_PME packets into a Pseudo-PME signal. The computer system 200 further comprises a PCI PME controller 250 comprising an event register 252. The event register 252 reports a power management event to the computer system 200. Further provided in the computer system 200 is a Pseudo-PME line (the Pseudo-PME# shown in FIG. 2) electrically connecting an output of the sequential circuit 212 to a PME input of the PCI PME controller 250.

The event register 252 is set when the Pseudo-PME signal changes from a first level to a second level. Further provided in the computer system 200 is a memory 254 comprising computer code executed by the computer system 200 when voltage of the Pseudo-PME signal changes from the second level to the first level. The computer code is capable of clearing the event register 252. The first level and the second level of the voltage of the Pseudo-PME signal mentioned above are PCI-compliant. The computer system 200 further comprises a timer 214 connected to the sequential circuit 212 to control when voltage of the Pseudo-PME signal is changed from the second level to the first level.

Although in FIG. 2 the timer 214 and the sequential circuit 212 are shown within the PCI Express Root Complex 210, this is a choice of design. Those skilled in the art can either implement the timer 214 and the sequential circuit 212 inside or outside the PCI Express Root Complex 210.

In contrast to the prior art, a PCI Express awakening mechanism is not needed to implement a computer system including both the PCI Express specification and the PCI specification so that related costs are reduced. Moreover, original microchips can be used to reduce the related costs while the software and hardware conflicts arising due to differences between the PCI Express specification and the PCI specification are eliminated as there is no second awakening mechanism in the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for Packet Triggered Power Management (PTPM) using a Peripheral Component Interconnect (PCI) traditional level triggered PM mechanism in a computer system, the computer system including a PCI level triggered Power Management Event (PME) controller and a PCI PTPM Root Complex, the method comprising:

converting a plurality of PM_PME packets generated by the PTPM PCI Root Complex into a Pseudo-PME signal, a first PM_PME packet of the plurality of PM_PME packets asserting the Pseudo-PME signal so that a voltage of Pseudo-PME signal changes from a first level to a second level;

providing a Pseudo-PME line electrically connected to a PME input of the PCIPME controller and the PCI PTPM Root Complex for transmitting the Pseudo-PME signal to the PCI PME controller, the PME input receiving PME signals generated by other PCI-compliant level triggered devices through a PCI Bus of the computer system; and de-asserting the Pseudo-PME signal so that the voltage of the Pseudo-PME signal changes from the second level to the first level, the de-assertion of the Pseudo-PME signal following the assertion of the Pseudo-PME signal by a predetermined time interval;

wherein the first level and the second level of the voltage of the Pseudo-PME signal are PCI-compliant with the level triggered PME controller.

2. The method of claim 1 wherein the PCI PME controller is a chipset of the computer system.

3. The method of claim 1 further comprising providing a sequential circuit to cnnvert the PM_PME packets into the Pseudo-PME signal.

4. The method of claim 3 wherein the sequential circuit is a latch or a flip-flop.

5. The method of claim 1 further comprising providing a timer to control a timer interval between asserting and de-asserting the Pseudo-PME signal.

6. The method of claim 1 further comprising converting a pulse of a PM_PME packet of the plurality of PM_PME packets into a lower frequency pulse to control a time interval between asserting and de-asserting the Pseudo-PME signal.

7. The method of claim 6 further comprising providing a synchronizer to convert the pulse of the PM_PME packet of the plurality of PM_PME packets into the lower frequency pulse.

8. The method of claim 6 wherein the lower frequency pulse is an active-low pulse and works as the Pseudo-PME signal in the computer system.

9. The method of claim 1 wherein the PCI PME controller includes an event register which can be set by the PCI PME controller when the Pseudo-PME signal is asserted but cannot be cleared when the Pseudo-PME signal is de-asserted, the method further comprises clearing the event register with a program of the computer system.

10. The method of claim 9 wherein the program is a device driver of the computer system.

11. A computer system comprising:
- a Packet Triggered Power Management (PTPM) PCI Root Complex for generating a plurality of PM_PME packets;
- a sequential circuit electrically connected to the PCI PTPM Root Complex for converting the plurality of PM_PME packets into a Pseudo-PME signal;
- a PCI PME controller comprising an event register, the event register for reporting a power management event to the computer system;
- a Pseudo-PME line electrically connecting an output of the sequential circuit to a PME input of the PCI PME controller, the event register being cleared when the Pseudo-PME signal changes from a first level to a second level; and
- a memory comprising computer code executed by the computer system when voltage of the Pseudo-PME signal changes from the second level to the first level, the computer code capable of clearing the event register;
- wherein the first level and the second level of the voltage of the Pseudo-PME signal are PCI-compliant with the level tiggered PME controller.

12. The computer system of claim 11 further comprising a timer connected to the sequential circuit to control when voltage of the Pseudo-PME signal is changed from the second level to the first level.

* * * * *